United States Patent
He et al.

(10) Patent No.: US 11,924,865 B2
(45) Date of Patent: *Mar. 5, 2024

(54) METHOD AND APPARATUS FOR DETERMINING DATA TRANSMISSION MODE, AND COMPUTER STORAGE MEDIUM

(71) Applicant: XI'AN ZHONGXING NEW SOFTWARE CO., LTD., Shaanxi (CN)

(72) Inventors: Meifang He, Guangdong (CN); He Huang, Guangdong (CN)

(73) Assignee: XI'AN ZHONGXING NEW SOFTWARE CO., LTD., Xi'An (CN)

(*) Notice: Subject to any disclaimer, the term of this patent is extended or adjusted under 35 U.S.C. 154(b) by 95 days.

This patent is subject to a terminal disclaimer.

(21) Appl. No.: 17/650,961

(22) Filed: Feb. 14, 2022

(65) Prior Publication Data

US 2022/0174689 A1  Jun. 2, 2022

Related U.S. Application Data

(63) Continuation of application No. 16/467,924, filed as application No. PCT/CN2017/114474 on Dec. 4, 2017, now Pat. No. 11,252,744.

(30) Foreign Application Priority Data

Dec. 8, 2016  (CN) .......................... 201611127911.6

(51) Int. Cl.
*H04W 72/50* (2023.01)
*H04W 72/21* (2023.01)
(Continued)

(52) U.S. Cl.
CPC ......... *H04W 72/535* (2023.01); *H04W 72/21* (2023.01); *H04W 72/23* (2023.01); *H04W 74/0833* (2013.01); *H04W 76/27* (2018.02)

(58) Field of Classification Search
None
See application file for complete search history.

(56) References Cited

U.S. PATENT DOCUMENTS 9,692,567 B1   6/2017  Vaidya
9,693,336 B2 * 6/2017  Pinheiro ................. H04L 25/03
(Continued)

FOREIGN PATENT DOCUMENTS

CN   101047974 A   10/2007
CN   102387495 A   3/2012
(Continued)

OTHER PUBLICATIONS

ZTE Corporation, "Text Proposal to TR 37.869 for Agreements Regarding SDDTE", 3GPP TSG-RAN WG2 Meeting #83 R2-133003—31 pages (Aug. 19-23, 2013).
(Continued)

*Primary Examiner* — Ajit Patel
(74) *Attorney, Agent, or Firm* — Knobbe, Martens, Olson & Bear, LLP

(57) ABSTRACT

Disclosed are a method and an apparatus for determining a data transmission mode, and a computer storage medium. The method includes: determining, by a terminal, a small data transmission mode corresponding to service data based on a preset policy, where small data refer to data of which data amount is less than or equal to a preset value; acquiring, by the terminal, the small data transmission mode supported by the base station through a system message; and transmitting, by the terminal, the service data through the small data transmission mode; where the small data transmission
(Continued)

A terminal determines a small data transmission mode corresponding to service data based on a preset policy, where small data refer to data of which data amount is less than or equal to a preset value — 401

The terminal notifies a base station of the small data transmission mode through an uplink message and/or transmits the service data through the small data transmission mode — 402 mode comprises at least one of: the terminal migrates from an inactive state to a full connection state, and transmits the service data in the full connection state; or the terminal transmits the service data in the inactive state.

17 Claims, 7 Drawing Sheets

(51) Int. Cl.
*H04W 72/23* (2023.01)
*H04W 76/27* (2018.01)

(56) References Cited

U.S. PATENT DOCUMENTS

| | | | |
|---|---|---|---|
| 9,860,924 | B2 | 1/2018 | Ianev |
| 10,485,033 | B2 | 11/2019 | Lim |
| 2012/0254890 | A1 | 10/2012 | Li |
| 2013/0028235 | A1* | 1/2013 | Barrett .................. H04W 60/04 370/331 |
| 2013/0051338 | A1 | 2/2013 | Ryu |
| 2013/0077484 | A1 | 3/2013 | Zhao |
| 2013/0080597 | A1 | 3/2013 | Liao |
| 2013/0083765 | A1 | 4/2013 | Ai |
| 2013/0272148 | A1 | 10/2013 | Fong |
| 2014/0036795 | A1 | 2/2014 | Tarradell |
| 2015/0113128 | A1 | 4/2015 | Huang |
| 2015/0195831 | A1 | 7/2015 | Du |
| 2016/0007213 | A1 | 1/2016 | Cui |
| 2016/0007388 | A1 | 1/2016 | Ianev |
| 2016/0044713 | A1 | 2/2016 | Du |
| 2016/0191382 | A1 | 6/2016 | Guo |
| 2016/0374048 | A1 | 12/2016 | Griot |
| 2017/0099675 | A1 | 4/2017 | Gineste |
| 2018/0152984 | A1 | 5/2018 | Palanisamy |

FOREIGN PATENT DOCUMENTS

| | | | | |
|---|---|---|---|---|
| CN | 103179549 | A | 6/2013 | |
| CN | 104010382 | A | 8/2014 | |
| CN | 104349388 | A | 2/2015 | |
| CN | 104363662 | A | 2/2015 | |
| CN | 105337893 | A | 2/2016 | |
| CN | 106961726 | B * | 1/2022 | ............ H04W 68/00 |
| EP | 2961205 | A1 | 12/2015 | |
| WO | WO 2014/156230 | A1 | 10/2014 | |
| WO | WO 2016/070838 | A1 | 5/2016 | |

OTHER PUBLICATIONS

International Search Report of PCT Application No. PCT/CN2017/114474, which is parent—2 pages (Feb. 26, 2018).
Office Action for CN 201611127911.6, dated Mar. 18, 2021.
Search Report for CN 201611127911.6, dated Mar. 11, 2021.

* cited by examiner

METHOD AND APPARATUS FOR DETERMINING DATA TRANSMISSION MODE, AND COMPUTER STORAGE MEDIUM

CROSS-REFERENCE TO RELATED APPLICATIONS

This application is a continuation application of U.S. patent application Ser. No. 16/467,924, filed on Jun. 7, 2019, which is a U.S. National Stage Application of International Patent Application No. PCT/CN2017/114474, filed on Dec. 4, 2017, which claims priority to Chinese Patent Application No. 201611127911.6 filed on Dec. 8, 2016, disclosures of which are incorporated herein by reference in their entireties.

BACKGROUND

Field

The present disclosure relates to the data transmission techniques in the field of wireless communications and, in particular, to a method and apparatus for determining a data transmission mode, and a computer storage medium.

Description of the Related Technology

Currently, there are three modes for a terminal to transmit uplink data. In a first mode, the terminal in an inactive state needs to migrate to a full connection state to transmit the data. The migration from the inactive state to the full connection state requires the terminal (a user equipment (UE)) and a base station (an eNB) to execute a series of signaling procedures shown in FIG. 1. The series of signaling procedures includes a random access procedure and a radio resource control (RRC) connection resume procedure. In a second mode, the terminal transmits the data together with an initial RRC message, as shown in FIG. 2. Then, the base station determines a final state of the terminal. In a third mode, the terminal supports data transmission in the inactive state, as shown in FIG. 3.

Currently, a Narrow Band-Internet of Thing (NB-IOT) function is introduced into the R13 version. The main service models of this function are shown in Table 1.

| Type | Application example | Size of uplink data | Size of downlink data | Frequency |
|---|---|---|---|---|
| Terminal autonomously reports a special report | Smoke alarm monitor, smart meter for energy failure notification, intervention notification, etc. | 20 bytes | 0 byte | Once in several months or in a year |
| Terminal autonomously reports a periodic report | Metering report for intelligent use (natural gas/water/electricity), intelligent agriculture, intelligent environment, etc. | If the total payload exceeds 200 bytes, only 200 bytes are taken. 20 bytes are transmitted each time. | 0 byte | 1 day (40%), 2 hours (40%), 1 hour (15%), and 30 minutes (5%) |
| Network command | Switch-on/switch-off, triggering of device for transmitting an uplink report, request for reading a metering result | 0 to 20 bytes 50% of the commands require an uplink response. | 20 bytes | 1 day (40%), 2 hours (40%), 1 hour (15%), and 30 minutes (5%) |
| Software update/model re-configuration | Software patch/update | If the total payload exceeds 2000 bytes, only 2000 bytes are taken. 200 bytes are transmitted each time. | If the total payload exceeds 2000 bytes, only 2000 bytes are taken. 200 bytes are transmitted each time. | 180 days |

As shown in Table 1, the data in the service models varies in length, and the data transmission mode may be a sudden abnormal transmission mode, or may be a periodical transmission mode.

The keep-alive message is a small amount of data periodically transmitted and received by the terminal. The keep-alive message is used for maintaining a transmission control protocol (TCP) connection between the terminal and the base station, or to maintain the presence of a downlink authentication UE. The service model of the keep-alive message highly depends on the server and the application user.

In the view of the small data service described above, it is impossible for the terminal in the inactive state to complete the transmission of all types of data by selecting one mode. An appropriate data transmission mode should be selected according to a certain principle, such as for the small data service. On this basis, it is unknown how to determine a small data transmission mode.

SUMMARY

The present disclosure provides a method and apparatus for determining a data transmission mode, and a computer storage medium.

An embodiment of the present disclosure provides a method for determining a data transmission mode. The method includes:
- determining, by a terminal, a small data transmission mode corresponding to service data based on a preset policy, where small data refer to data of which data amount is less than or equal to a preset value; and
- notifying, by the terminal, a base station of the small data transmission mode through an uplink message and/or transmitting the service data through the small data transmission mode.

Another embodiment of the present disclosure provides a method for determining a data transmission mode. The method includes:
- determining, by a base station, a small data transmission mode corresponding to service data based on a preset policy, where small data refer to data of which data amount is less than or equal to a preset value; and
- notifying, by the base station, a terminal of the small data transmission mode through a downlink message.

An embodiment of the present disclosure provides an apparatus for determining a data transmission mode. The apparatus includes:
- a first determination unit, which is configured to determine a small data transmission mode corresponding to service data based on a preset policy, where small data refer to data of which data amount is less than or equal to a preset value; and an uplink notification unit, which is configured to notify a base station of the small data transmission mode through an uplink message and/or transmit the service data through the small data transmission mode.

Another embodiment of the present disclosure provides an apparatus for determining a data transmission mode. The apparatus includes:
- a second determination unit, which is configured to determine a small data transmission mode corresponding to service data based on a preset policy, where small data refer to data of which data amount is less than or equal to a preset value; and
- a downlink notification unit, which is configured to notify a terminal of the small data transmission mode through a downlink message.

The embodiments of the present disclosure further provide a computer storage medium storing computer programs which are configured to execute the method for determining a data transmission mode described above.

In the embodiments of the present disclosure, a terminal determine a small data transmission mode corresponding to service data based on a preset policy, where small data refer to data of which data amount is less than or equal to a preset value, and notifies a base station of the small data transmission mode through an uplink message; or the base station determines a small data transmission mode corresponding to service data based on a preset policy, where small data refer to data of which data amount is less than or equal to a preset value, and notifies a terminal of the small data transmission mode through a downlink message. As such, an appropriate small data transmission mode may be selected through the preset policy, thereby ensuring reduction of signaling load caused by the small data transmission and reducing the power consumption of the terminal.

BRIEF DESCRIPTION OF THE DRAWINGS

The drawings generally illustrate various embodiments discussed in the present disclosure by way of examples rather than limitations.

DETAILED DESCRIPTION

To provide a more detailed understanding of features and content of embodiments of the present disclosure, implementation of the embodiments of the present disclosure is described below in detail with reference to the drawings. The drawings are provided for reference only and are not intended to limit the embodiments of the present disclosure.

Figure 1:
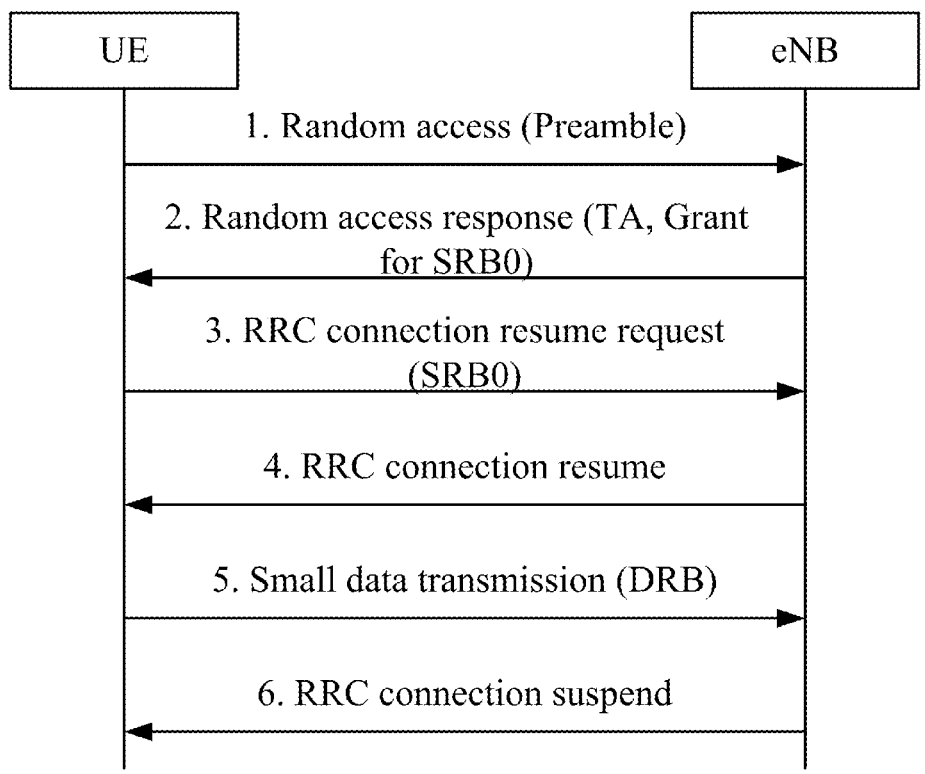
FIG. 1 is a flowchart of data transmission after migration of a terminal from an inactive state to a full connection state.
Figure 2:
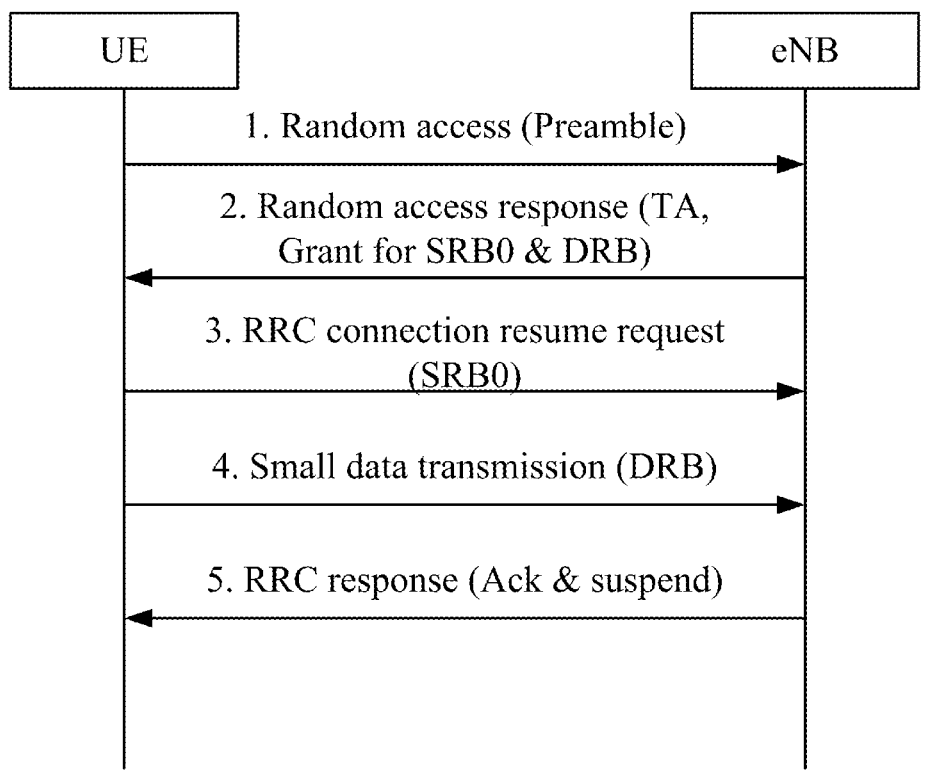
FIG. 2 is a flowchart of data transmission in a random access process.
Figure 3:
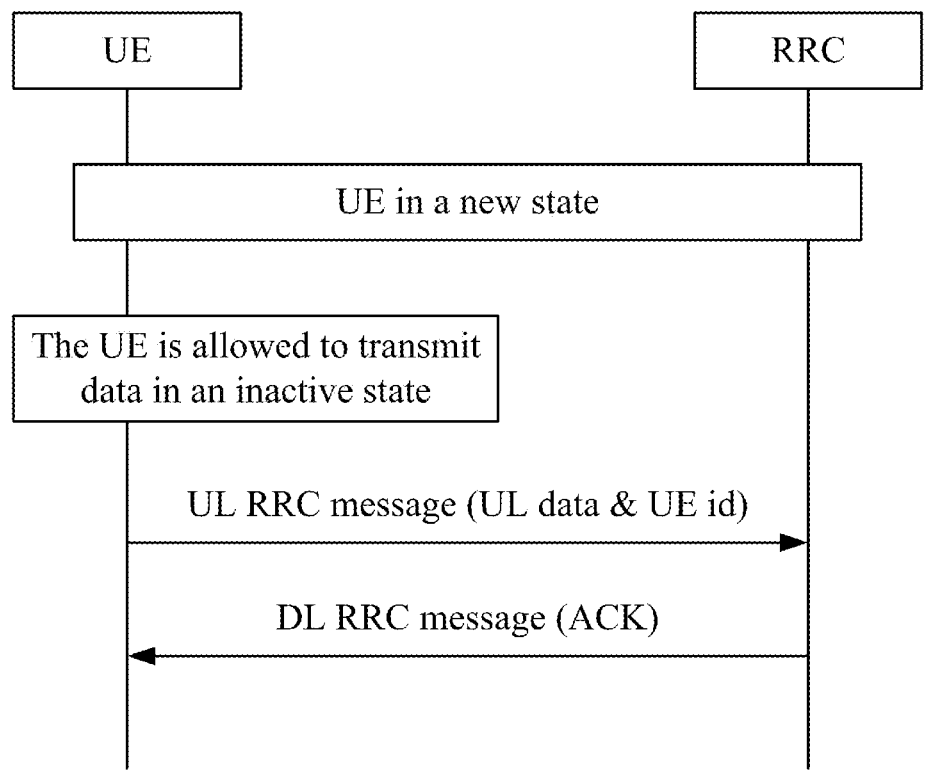
FIG. 3 is a flowchart of data transmission of a UE in an inactive state.
Figure 4:
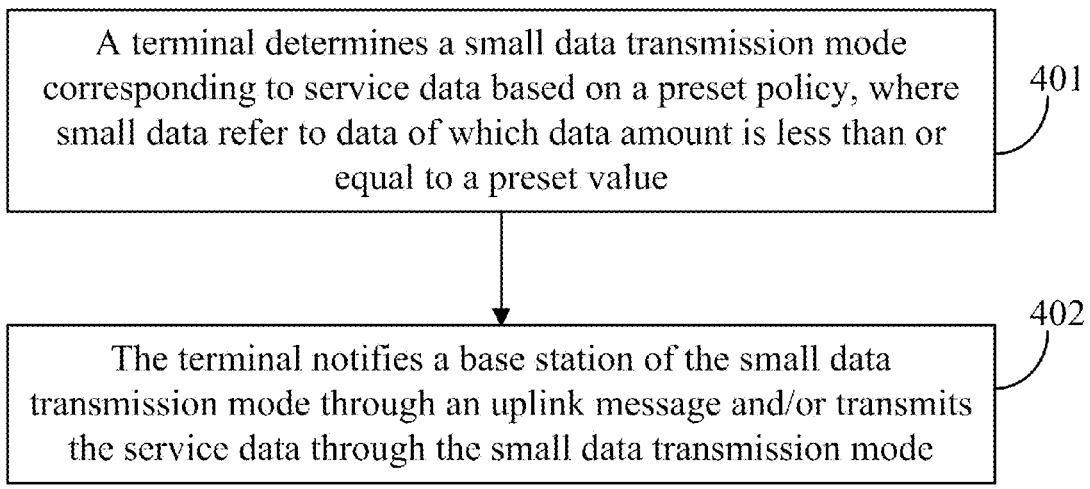
FIG. 4 is a flowchart 1 of a method for determining a data transmission mode according to an embodiment of the present disclosure.

FIG. 4 is a flowchart 1 of a method for determining a data transmission mode according to an embodiment of the present disclosure. The method for determining a data transmission mode in this embodiment is applied to a terminal side. As shown in FIG. 4, the method for determining a data transmission mode includes the steps described below.

In step 401, a terminal determines a small data transmission mode corresponding to service data based on a preset policy, where small data refer to data of which data amount is less than or equal to a preset value.

In this embodiment, the terminal may be any type of terminal, such as a massive machine type communication (mMTC) terminal.

In this embodiment, the small data transmission mode includes at least one of:
- the terminal migrates from an inactive state to a full connection state, and transmits the service data in the full connection state;
- the terminal transmits the service data and a radio resource control (RRC) message in an initial RRC process; or
- the terminal transmits the service data in the inactive state.

In this embodiment, the step in which a terminal determines a small data transmission mode corresponding to service data based on a preset policy includes at least one of:

the terminal determines the small data transmission mode corresponding to the service data according to a set operation;

the terminal determines the small data transmission mode corresponding to the service data according to a service model;

the terminal determines the small data transmission mode corresponding to the service data according to a logical channel; or the terminal determines the small data transmission mode corresponding to the service data according to a battery level of a local battery.

In an embodiment, the step in which the terminal determines the small data transmission mode corresponding to the service data according to the service model includes at least one of:

the small data transmission mode corresponding to service data of the service model is determined according to a mapping relationship between the service model and the small data transmission mode;

the small data transmission mode corresponding to the service data is determined according to a data size of the service model;

the small data transmission mode corresponding to the service data is determined according to an inactive duration of the service model; or the small data transmission mode corresponding to the service data is determined according to a transmission frequency of the service model.

In step 402, the terminal notifies a base station of the small data transmission mode through an uplink message and/or transmits the service data through the small data transmission mode.

In this embodiment, before the terminal notifies the base station of the small data transmission mode through the uplink message, the method further includes:

the terminal acquires a small data transmission mode supported by the base station through a system message.

In this embodiment, the terminal notifies the base station of the small data transmission mode through an uplink message in an explicit manner, or notifies the base station of the small data transmission mode in an implicit manner. For example, the terminal notifies the base station in the implicit manner through three procedures for small data transmission.

Figure 5:
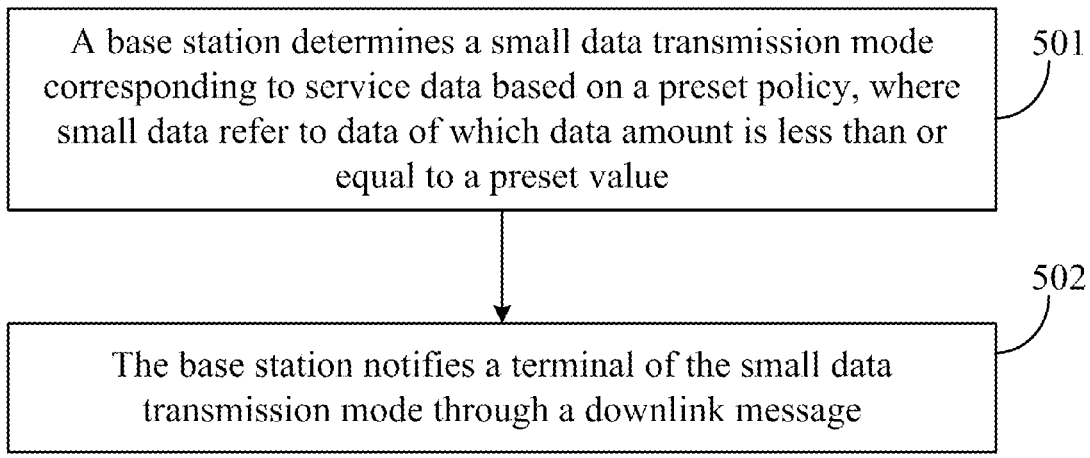
FIG. 5 is a flowchart 2 of a method for determining a data transmission mode according to an embodiment of the present disclosure.

FIG. 5 is a flowchart 2 of a method for determining a data transmission mode according to an embodiment of the present disclosure. The method for determining a data transmission mode in this embodiment is applied to a base station. As shown in FIG. 5, the method for determining a data transmission mode includes the steps described below.

In step 501, a base station determines a small data transmission mode corresponding to service data based on a preset policy, where small data refer to data of which data amount is less than or equal to a preset value.

In this embodiment, the terminal may be any type of terminal, such as an mMTC terminal.

In this embodiment, the small data transmission mode includes at least one of:

the terminal migrates from an inactive state to a full connection state, and transmits the service data in the full connection state;

the terminal transmits the service data and a radio resource control (RRC) message in an initial RRC process; or the terminal transmits the service data in the inactive state.

In this embodiment, the step in which a base station determines a small data transmission mode corresponding to service data based on a preset policy includes at least one of:

the base station determines the small data transmission mode corresponding to the service data based on a capability, reported by the terminal, of supporting small data service transmission, where a small data service refers to a data service of which service data amount is less than or equal to a preset value;

the base station determines the small data transmission mode corresponding to the service data according to a service model;

the base station determines the small data transmission mode corresponding to the service data according to a logical channel;

the base station determines the small data transmission mode corresponding to the service data according to a current load;

the base station determines the small data transmission mode corresponding to the service data according to a battery level of a local battery; or the base station determines the small data transmission mode corresponding to the service data according to a terminal type.

In an embodiment, the step in which the base station determines the small data transmission mode corresponding to the service data according to the service model includes at least one of:

the small data transmission mode corresponding to service data of the service model is determined according to a mapping relationship between the service model and the small data transmission mode;

the small data transmission mode corresponding to the service data is determined according to a data size of the service model;

the small data transmission mode corresponding to the service data is determined according to an inactive duration of the service model; or the small data transmission mode corresponding to the service data is determined according to a transmission frequency of the service model.

In step 502, the base station notifies a terminal of the small data transmission mode through a downlink message.

In this embodiment, before the base station notifies a terminal of the small data transmission mode through a downlink message, the method further includes:

the base station acquires a service model of the terminal through an uplink message or an S1 interface message.

In this embodiment, the content carried in the downlink message includes at least one of:

small data transmission modes corresponding to various service models;

a default small data transmission mode;

a small data transmission mode determined according to the data size of the service model;

a small data transmission mode determined according to the inactive duration of the service mode; or a small data transmission mode determined according to the transmission frequency of the service model.

The embodiments in the present disclosure are described below in detail in conjunction with specific application scenarios.

Embodiment 1

Figure 6:
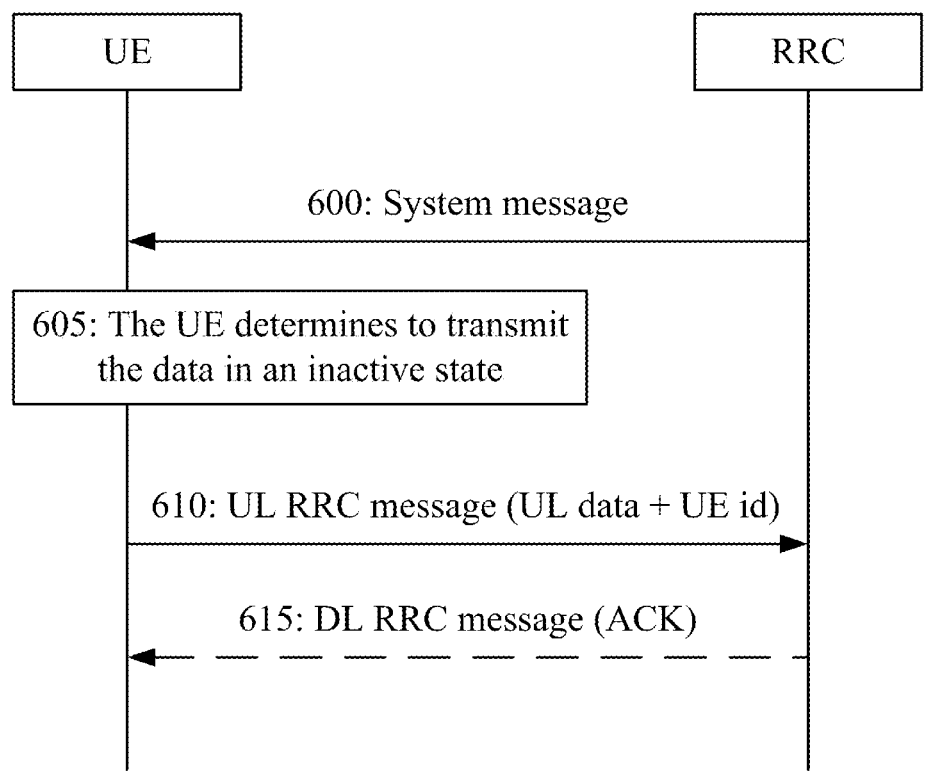
FIG. 6 is a flowchart of an embodiment 1 of the present disclosure.

Referring to FIG. 6, the embodiment 1 is described below.

In step 600, a user equipment (UE) acquires a small data transmission mode supported by an eNB through a system message.

The eNB supports three small data transmission modes, which are respectively described below.

1. The terminal in the inactive state needs to migrate to the full connection state to transmit the data.
2. The terminal transmits the data together with an initial RRC message.
3. The terminal supports data transmission in the inactive state.

The data transmission modes 2 and 3 are broadcasted to the UE through the system message.

In step 605, the UE determines the small data transmission mode.

The small data transmission mode is determined based on at least one of:

1. the determination of the small data transmission mode is implemented inside the terminal;
2. the terminal determines the small data transmission mode according to various service models;
3. the terminal determines the small data transmission mode according to the logical channel; or
4. the terminal determines the small data transmission mode according to a battery level of a local battery.

In an embodiment, the determination of the small data transmission mode according to various service models may include at least one of:

the service model is directly mapped to the small data transmission mode through a mapping table;

the small data transmission mode is determined according to the data size of the service model;

the small data transmission mode is determined according to the inactive duration of the service mode; or the small data transmission mode determined according to the transmission frequency of the service model.

In an embodiment, the determination of the small data transmission mode according to the logical channel may include at least one of:

a common control channel (CCCH) is mapped to the small data transmission mode 3;

a dedicated control channel (DCCH) is mapped to the small data transmission mode 2; or a dedicated traffic channel (DTCH) is mapped to the small data transmission mode 1 or 2 or 3.

In this embodiment, the small data transmission mode is selected in a logical channel mapping manner, the UE needs to report a keep-alive message, and select a CCCH channel to transmit the data, and knows that the small data transmission mode is the mode 3 through the CCCH channel. In other words, the UE transmits the data in the inactive state.

In step 610, the UE directly transmits the keep-alive message to the base station through scheduling-free resources.

In step 615, the UE receives an acknowledgement message indicating that the base station has received the keep-alive message (the acknowledgement message is not necessary).

Embodiment 2

Figure 7:
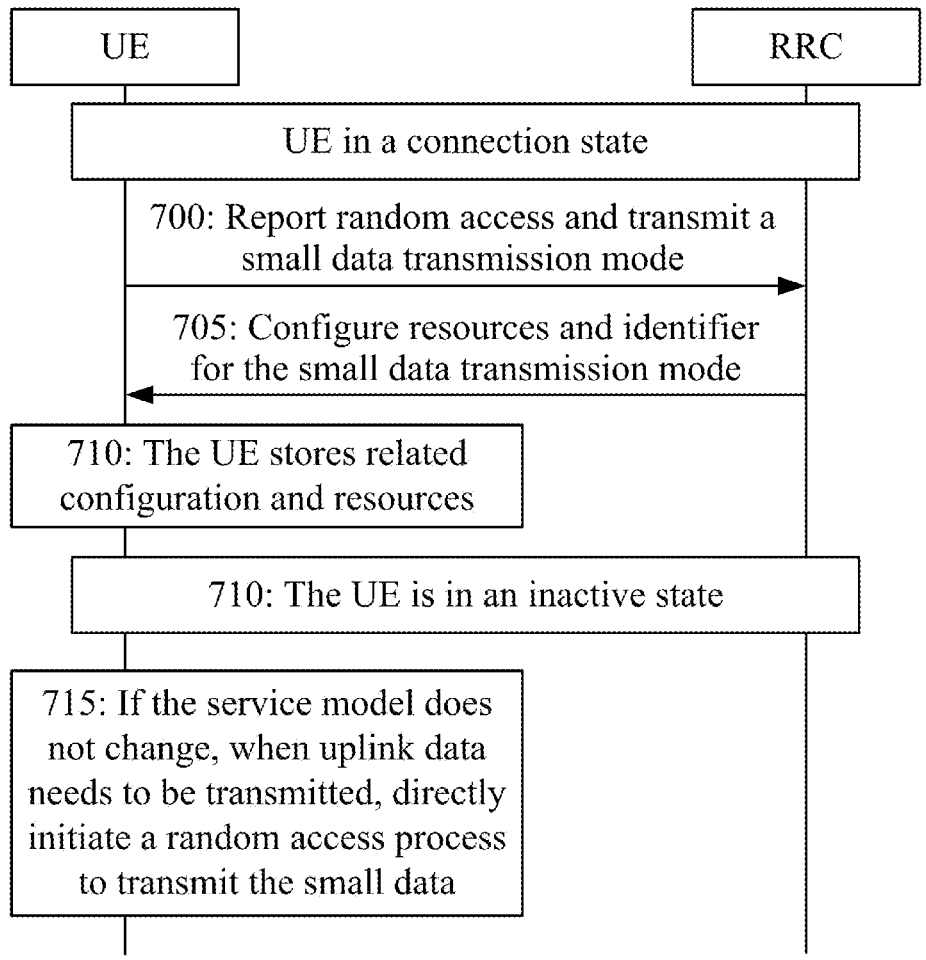
FIG. 7 is a flowchart of an embodiment 2 of the present disclosure.

Referring to FIG. 7, the embodiment 2 is described below.

In step 700, the UE in a connection state transmits the small data transmission mode, which has been determined by the UE, to the base station through an uplink message.

In this embodiment, the terminal determines that the transmission mode is the data transmission mode 2, that is, the data transmission is accompanied by the initial RRC connection process. The terminal stores the selected small data transmission mode.

In step 705, the base station sends a response message to the terminal. The response message carries configuration related to the resources for corresponding data transmission and includes the size of a grant, the size of a data packet, etc.

In step 710, the terminal stores the related configuration and enters the inactive state.

In step 715, when uplink data arrives at the terminal, the terminal directly initiates a random access process to transmit the small data if the service model does not change.

Embodiment 3

Figure 8:
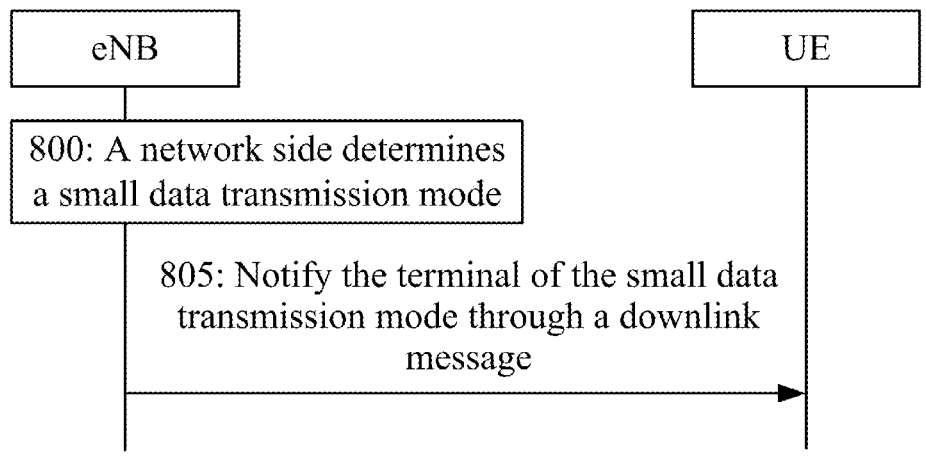
FIG. 8 is a flowchart of an embodiment 3 of the present disclosure.

In conjunction with FIG. 8, the embodiment 3 is described below.

In step 800, the base station determines a small data transmission mode.

For the small data transmission mode, reference may be made to the description of the embodiment 1.

The small data transmission mode is determined through various combinations of following conditions:

the small data transmission mode is determined based on a capability of supporting small data service transmission reported by the terminal;

the base station determines the small data transmission mode according to various service models;

a network determines the small data transmission mode according to the logical channel;

the base station determines the small data transmission mode according to a current load;

the base station determines the small data transmission mode according to a current battery level; and the base station determines the small data transmission mode of a terminal according a terminal type; for example, in order to save power in the terminal, the system message specifies that the mMTC terminal adopts the inactive state to transmit the data.

In an embodiment, for the determination of the small data transmission mode according to various service models, reference may be made to the description of the embodiment 1.

In an embodiment, before the base station sends the small data transmission mode which has been determined by the base station, the base station acquires the service model of the terminal through an uplink message or an S1 interface message.

In step 805, the base station notifies the terminal of the small data transmission mode through a downlink message.

The downlink message is a system broadcast message or a dedicated resource message.

The content carried in the downlink message includes one or more of:

small data transmission modes corresponding to various service models;

a default small data transmission mode;

a small data transmission mode determined according to the data size of the service model;

a small data transmission mode determined according to the inactive duration of the service mode; or a small data transmission mode determined according to the transmission frequency of the service model.

Figure 9:
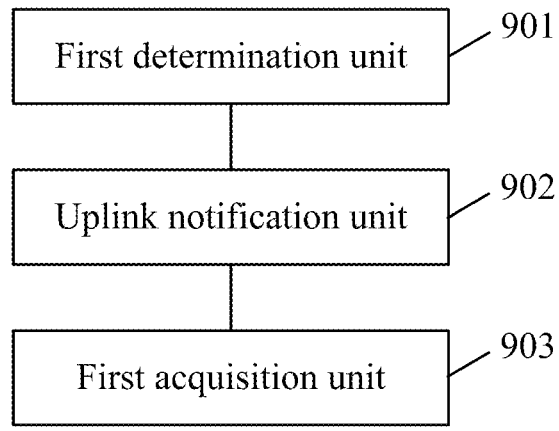
FIG. 9 is a structural diagram 1 of an apparatus for determining a data transmission mode according to an embodiment of the present disclosure.

FIG. 9 is a structural diagram 1 of an apparatus for determining a data transmission mode according to an embodiment of the present disclosure. As shown in FIG. 9, the apparatus includes a first determination unit 901 and an uplink notification unit 902.

The first determination unit 901 is configured to determine a small data transmission mode corresponding to service data based on a preset policy, where small data refer to data of which data amount is less than or equal to a preset value.

The uplink notification unit 902 is configured to notify a base station of the small data transmission mode through an uplink message and/or transmit the service data through the small data transmission mode.

In this embodiment, the small data transmission mode includes at least one of:
- the terminal migrates from an inactive state to a full connection state, and transmits the service data in the full connection state;
- the terminal transmits the service data and an RRC message in an initial RRC process; or
- the terminal transmits the service data in the inactive state.

In this embodiment, the first determination unit 901 is configured to determine the small data transmission mode corresponding to the service data through at least one of following manners:
- the terminal determines the small data transmission mode corresponding to the service data according to a set operation;
- the terminal determines the small data transmission mode corresponding to the service data according to a service model;
- the terminal determines the small data transmission mode corresponding to the service data according to a logical channel; and
- the terminal determines the small data transmission mode corresponding to the service data according to a battery level of a local battery.

In this embodiment, the first determination unit 901 is further configured to determine the small data transmission mode corresponding to the service data through at least one of following manners:
- the small data transmission mode corresponding to service data of the service model is determined according to a mapping relationship between the service model and the small data transmission mode;
- the small data transmission mode corresponding to the service data is determined according to a data size of the service model;
- the small data transmission mode corresponding to the service data is determined according to an inactive duration of the service model; and
- the small data transmission mode corresponding to the service data is determined according to a transmission frequency of the service model.

In this embodiment, the apparatus further includes a first acquisition unit 903.

The first acquisition unit 903 is configured to acquire a small data transmission mode supported by the base station through a system message.

In this embodiment, the uplink notification unit 902 is configured to notify the base station of the small data transmission mode through an uplink message in an explicit manner, or notify the base station of the small data transmission mode in an implicit manner.

In practical, the functions of various units of the apparatus for determining a small data transmission may be implemented by a central processing unit (CPU) or a micro processor unit (MPU) or a digital signal processor (DSP) or a field programmable gate array (FPGA) or the like located in the apparatus for determining a small data transmission.

Figure 10:
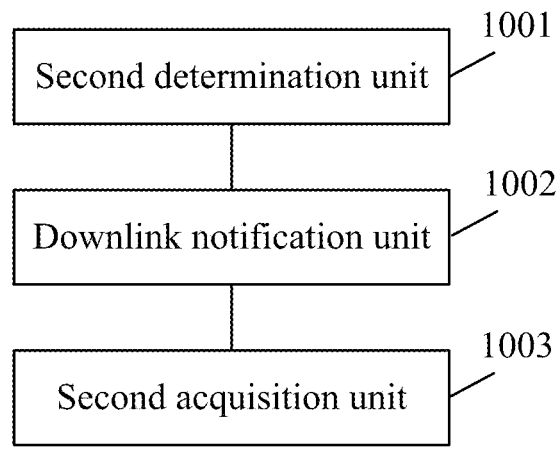
FIG. 10 is a structural diagram 2 of an apparatus for determining a data transmission mode according to an embodiment of the present disclosure.

FIG. 10 is a structural diagram 2 of an apparatus for determining a data transmission mode according to an embodiment of the present disclosure. As shown in FIG. 10, the apparatus includes a second determination unit 1001 and a downlink notification unit 1002.

The second determination unit 1001 is configured to determine a small data transmission mode corresponding to service data based on a preset policy, where small data refer to data of which data amount is less than or equal to a preset value.

The downlink notification unit 1002 is configured to notify a terminal of the small data transmission mode through a downlink message.

In this embodiment, the small data transmission mode includes at least one of:
- the terminal migrates from an inactive state to a full connection state, and transmits the service data in the full connection state;
- the terminal transmits the service data and an RRC message in an initial RRC process; or
- the terminal transmits the service data in the inactive state.

In this embodiment, the second determination unit 1001 is configured to determine the small data transmission mode corresponding to the service data through at least one of following manners:
- the base station determines the small data transmission mode corresponding to the service data based on a capability, reported by the terminal, of supporting small data service transmission, where a small data service refers to a data service of which service data amount is less than or equal to a preset value;
- the base station determines the small data transmission mode corresponding to the service data according to a service model;
- the base station determines the small data transmission mode corresponding to the service data according to a logical channel;
- the base station determines the small data transmission mode corresponding to the service data according to a current load;
- the base station determines the small data transmission mode corresponding to the service data according to a battery level of a local battery; and
- the base station determines the small data transmission mode corresponding to the service data according to a terminal type.

In this embodiment, the second determination unit 1001 is further configured to determine the small data transmission mode corresponding to the service data through at least one of following manners:
- the small data transmission mode corresponding to service data of the service model is determined according to a mapping relationship between the service model and the small data transmission mode;
- the small data transmission mode corresponding to the service data is determined according to a data size of the service model;

the small data transmission mode corresponding to the service data is determined according to an inactive duration of the service model; and the small data transmission mode corresponding to the service data is determined according to a transmission frequency of the service model.

In this embodiment, the apparatus further includes a second acquisition unit 1003.

The second acquisition unit 1003 is configured to acquire a service model of the terminal through an uplink message or an S1 interface message.

In this embodiment, the content carried in the downlink message includes at least one of:

small data transmission modes corresponding to various service models;

a default small data transmission mode;

a small data transmission mode determined according to the data size of the service model;

a small data transmission mode determined according to the inactive duration of the service mode; or a small data transmission mode determined according to the transmission frequency of the service model.

In practical applications, the functions of various units of the apparatus for determining a small data transmission mode may be implemented by a CPU, or an MPU, or a DSP, or an FPGA, or the like located in the apparatus for determining a small data transmission mode.

It should be understood by those skilled in the art that the embodiments of the present disclosure may be provided as methods, systems, or computer program products. Therefore, the present disclosure may adopt a form of a hardware embodiment, a software embodiment, or a combination of hardware and software embodiments. In addition, the present disclosure may adopt a form of a computer program product implemented on one or more computer-usable storage media (including, but not limited to, a disk memory, an optical memory and the like) which include computer-usable program codes.

The present disclosure is described with reference to flowcharts and/or block diagrams of methods, devices (systems) and computer program products according to the embodiments of the present disclosure. It should be understood that computer program instructions implement each flow and/or block in the flowcharts and/or block diagrams and a combination of flows and/or blocks in the flowcharts and/or block diagrams. These computer program instructions may be provided to a general-purpose computer, a special-purpose computer, an embedded processor or a processor of another programmable data processing device to produce a machine so that instructions executed by a computer or the processor of another programmable data processing device produce a means for implementing functions specified in one or more flows in the flowcharts and/or one or more blocks in the block diagrams.

These computer program instructions may also be stored in a computer-readable memory which may direct the computer or another programmable data processing device to operate in a particular manner so that the instructions stored in the computer-readable memory produce a manufactured product including an instructing means. The instructing means implements the functions specified in one or more flows in the flowcharts and/or one or more blocks in the block diagrams.

These computer program instructions may also be loaded onto the computer or another programmable data processing device so that a series of operation steps are performed on the computer or another programmable device to produce processing implemented by the computer. Therefore, instructions executed on the computer or another programmable device provide steps for implementing the functions specified in one or more flows in the flowcharts and/or one or more blocks in the block diagrams.

Accordingly, the embodiments of the present disclosure further provide a computer storage medium storing computer programs which are configured to execute the method for determining a data transmission mode described in the embodiments of the present disclosure.

The above are only some embodiments of the present disclosure and are not intended to limit the scope of the present disclosure.

INDUSTRIAL APPLICABILITY

In the present disclosure, the terminal determine a small data transmission mode corresponding to service data based on a preset policy, where small data refer to data of which data amount is less than or equal to a preset value, and notifies the base station of the small data transmission mode through an uplink message; or the base station determines a small data transmission mode corresponding to service data based on a preset policy, where small data refer to data of which data amount is less than or equal to a preset value, and notifies the terminal of the small data transmission mode through a downlink message. Therefore, an appropriate small data transmission mode may be selected through the presser policy, thereby ensuring reduction of signaling load caused by the small data transmission and reducing the power consumption of the terminal.

What is claimed is:

1. A method for determining a data transmission mode, comprising:

determining, by a terminal, a small data transmission mode corresponding to service data based on a preset policy, wherein small data refers to data of which data amount is less than or equal to a preset value;

acquiring, by the terminal, the small data transmission mode supported by the base station through a system message; and transmitting, by the terminal, the service data through the small data transmission mode;

wherein the small data transmission mode comprises at least one of:

the terminal migrates from an inactive state to a full connection state, and transmits the service data in the full connection state; or the terminal transmits the service data in the inactive state;

wherein determining, by the terminal, the small data transmission mode corresponding to the service data based on the preset policy comprises: determining, by the terminal, the small data transmission mode corresponding to the service data according to a logical channel;

wherein determining, by the terminal, the small data transmission mode corresponding to the service data according to the logical channel comprises: mapping, by the terminal, a dedicated traffic channel (DTCH) to one of the small data transmission mode.

2. The method for determining a data transmission mode of claim 1, wherein determining, by the terminal, the small data transmission mode corresponding to the service data based on the preset policy further comprises at least one of:

determining, by the terminal, the small data transmission mode corresponding to the service data according to a set operation;

determining, by the terminal, the small data transmission mode corresponding to the service data according to a service model; or determining, by the terminal, the small data transmission mode corresponding to the service data according to a battery level of a local battery.

3. The method for determining a data transmission mode of claim 2, wherein determining, by the terminal, the small data transmission mode corresponding to the service data according to the service model comprises at least one of:

determining a small data transmission mode corresponding to service data of the service model according to a mapping relationship between the service model and the small data transmission mode;

determining the small data transmission mode corresponding to the service data according to a data size of the service model;

determining the small data transmission mode corresponding to the service data according to an inactive duration of the service model; or determining the small data transmission mode corresponding to the service data according to a transmission frequency of the service model.

4. The method for determining a data transmission mode of claim 1, wherein the method further comprises:

notifying, by the terminal, the base station of the small data transmission mode through an uplink message in an implicit manner.

5. A method for determining a data transmission mode, comprising:

determining, by a base station, a small data transmission mode corresponding to service data based on a preset policy, wherein small data refers to data of which data amount is less than or equal to a preset value; and notifying, by the base station, a terminal of the small data transmission mode through a system message;

wherein the small data transmission mode comprises at least one of:

the terminal migrates from an inactive state to a full connection state, and transmits the service data in the full connection state; or the terminal transmits the service data in the inactive state;

wherein determining, by the base station, the small data transmission mode corresponding to the service data according to the service model comprises: determining, by the base station, the small data transmission mode corresponding to the service data according to a logical channel;

wherein determining, by the base station, the small data transmission mode corresponding to the service data according to the logical channel comprises: mapping, by the base station, a dedicated traffic channel (DTCH) to one of small data transmission modes.

6. The method for determining a data transmission mode of claim 5, wherein determining, by the base station, the small data transmission mode corresponding to the service data based on the preset policy further comprises at least one of:

determining, by the base station, the small data transmission mode corresponding to the service data based on a capability, reported by the terminal, of supporting small data service transmission, wherein a small data service refers to a data service of which service data amount is less than or equal to a preset value;

determining, by the base station, the small data transmission mode corresponding to the service data according to a service model;

determining, by the base station, the small data transmission mode corresponding to the service data according to a current load;

determining, by the base station, the small data transmission mode corresponding to the service data according to a battery level of a local battery; or determining, by the base station, the small data transmission mode corresponding to the service data according to a terminal type.

7. The method for determining a data transmission mode of claim 6, wherein determining, by the base station, the small data transmission mode corresponding to the service data according to the service model comprises at least one of:

determining a small data transmission mode corresponding to service data of the service model according to a mapping relationship between the service model and the small data transmission mode;

determining the small data transmission mode corresponding to the service data according to a data size of the service model;

determining the small data transmission mode corresponding to the service data according to an inactive duration of the service model; or determining the small data transmission mode corresponding to the service data according to a transmission frequency of the service model.

8. The method for determining a data transmission mode of claim 7, wherein before notifying, by the base station, the small data transmission mode to the terminal through the downlink message, the method further comprises:

acquiring, by the base station, a service model of the terminal through an uplink message or an S1 interface message.

9. The method for determining a data transmission mode of claim 5, wherein the small data transmission mode is notified by the terminal in an implicit manner.

10. An apparatus for determining a data transmission mode, comprising:

a processor; and a memory for storing instructions executable by the processor, wherein the processor is configured to:

determine a small data transmission mode corresponding to service data based on a preset policy, wherein small data refers to data of which data amount is less than or equal to a preset value;

acquire the small data transmission mode supported by the base station through a system message; and transmit the service data through the small data transmission mode;

wherein the small data transmission mode comprises at least one of:

the terminal migrates from an inactive state to a full connection state, and transmits the service data in the full connection state; or the terminal transmits the service data in the inactive state;

wherein the processor is configured to determine the small data transmission mode corresponding to the service data based on the preset policy in the following manner: determining the small data transmission mode corresponding to the service data according to a logical channel;

wherein the processor is configured to determine the small data transmission mode corresponding to the service data according to the logical channel in the following manner:

mapping a dedicated traffic channel (DTCH) to one of small data transmission modes.

11. The apparatus for determining a data transmission mode of claim 10, wherein the processor is further configured to determine the small data transmission mode corresponding to the service data based on the preset policy in at least one of:

determining the small data transmission mode corresponding to the service data according to a set operation;

determining the small data transmission mode corresponding to the service data according to a service model; or determining the small data transmission mode corresponding to the service data according to a battery level of a local battery.

12. The apparatus for determining a data transmission mode of claim 11, wherein the processor is configured to determine the small data transmission mode corresponding to the service data according to the service model in at least one of:

determining a small data transmission mode corresponding to service data of the service model according to a mapping relationship between the service model and the small data transmission mode;

determining the small data transmission mode corresponding to the service data according to a data size of the service model;

determining the small data transmission mode corresponding to the service data according to an inactive duration of the service model; or determining the small data transmission mode corresponding to the service data according to a transmission frequency of the service model.

13. The apparatus for determining a data transmission mode of claim 10, wherein the processor is configured to:

notify the base station of the small data transmission mode through an uplink message in an implicit manner.

14. An apparatus for determining a data transmission mode, comprising:

a processor; and a memory for storing instructions executable by the processor, wherein the processor is configured to execute the method for determining a data transmission mode of claim 5.

15. The apparatus for determining a data transmission mode of claim 14, wherein the processor is further configured to determine the small data transmission mode corresponding to the service data based on the preset policy in at least one of:

determining the small data transmission mode corresponding to the service data based on a capability, reported by the terminal, of supporting small data service transmission, wherein a small data service refers to a data service of which service data amount is less than or equal to a preset value;

determining the small data transmission mode corresponding to the service data according to a service model;

determining the small data transmission mode corresponding to the service data according to a logical channel;

determining the small data transmission mode corresponding to the service data according to a current load;

determining the small data transmission mode corresponding to the service data according to a battery level of a local battery; or determining the small data transmission mode corresponding to the service data according to a terminal type.

16. A computer storage medium storing computer-executable instructions which are configured to execute the method by a processor for determining a data transmission mode of claim 1.

17. A computer storage medium storing computer-executable instructions which are configured to execute the method by a processor for determining a data transmission mode of claim 5.

* * * * *